Patented Dec. 19, 1933

1,940,390

UNITED STATES PATENT OFFICE 1,940,390

PROCESS FOR BREAKING PETROLEUM EMULSIONS

Melvin De Groote, St. Louis, Mo., and Louis T. Monson, Los Angeles, Calif., assignors to Tretolite Company, Webster Groves, Mo., a corporation of Missouri No Drawing. Application October 5, 1931 Serial No. 567,134

20 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil," "roily oil", "emulsified oil" and "bottom settlings".

The main object of our invention is to provide a process for breaking or separating petroleum emulsions of the water-in-oil type, which is inexpensive and reliable, and which is distinguished from prior chemical processes for demulsifying petroleum emulsions, by the use of a treating agent of novel composition.

Another object is to provide a process for breaking or separating petroleum emulsions of the water-in-oil type, that is characterized by the use of a treating agent that can be produced from easily obtainable materials and manufactured in such a way that the treating agent does not contain or have incorporated therein substances which are of little or no value in treating the particular emulsion on which the process is used.

Briefly described, our process consists in subjecting a petroleum emulsion of the water-in-oil type to the action of a chemical demulsifying agent or treating agent that comprises a derivative of a hydrogenated multiactive fatty material. The treating agent may be produced or manufactured in various ways, and it may have various characteristics, hereinafter mentioned, in addition to the essential and distinguishing characteristic of comprising a derivative of a hydrogenated multi-active fatty body. As herein used, the term "multi-active fatty body" is intended to refer to and mean a fatty material, or composition of fatty materials, that is susceptible of chemical reaction at more than one point other than the carboxyl hydrogen, such, for example, as a fatty body having more than one double bond, or more than one reactive hydroxyl group, or one such hydroxyl group and one double bond. We do not consider simple salt-forming power, conferred by the carboxyl hydrogen of the fatty body having one double bond or one alcoholic hydroxyl group, as making such a body "multi-active".

The term "hydrogenated" is herein used in the same sense that it is used in the fat industry. Thus, the term "hydrogenated multi-active fatty body", as herein used, refers to the product or products obtained by subjecting a multi-active fatty body to the conventional hydrogenation process employed in preparing soap stock or hard edible fats. We are aware of the fact that hydrogenation of an unsaturated hydroxylated fatty body like castor oil may be so conducted as to reduce the hydroxyl group, as well as to saturate the double bond. It is to be understood that in the hydrogenated hydroxylated materials used in the preparation of the treating agent contemplated by our process, the hydroxyl group is always present in some degree. Completely hydrogenated materials are of no merit in preparing our improved treating agent. For example, ricinoleic acid would become stearic acid on complete hydrogenation; and stearic acid is inert towards sulfuric acid.

Our process is of great utility and has great commercial value, in that the treating agent employed is free from lactones, lactone-like materials and polymerized bodies, such as poly acids which are not particularly adapted for the treatment of certain petroleum emulsions.

Another advantage of our invention is that the treating agent employed in our process is of such a nature or character that it can be reliably manufactured without liability of having incorporated therein the objectionable or non-active substances above referred to, to wit, polymerized bodies, and said treating agent can be manufactured or produced from materials that are easily obtainable in a more or less completely hydrogenated state, such as hydrogenated castor oil or hydrogenated whale oil.

In practising our process we prefer to use a treating agent that is derived from either a hydrogenated castor oil or a hydrogenated linseed oil, although other hydrogenated oils may be employed. If hydrogenated castor oil is used, the oil may be subjected to sulfonation by the action of 25% by weight of 66° sulfuric acid. Such treatment or reaction produces what we believe to be a sulfuric acid ester of hydrogenated castor oil. After sulfonation has proceeded far enough to produce the correct degree of sulfonation for the particular petroleum emulsion on which the treating agent is to be used, the excess of sulfuric acid is removed. The remaining fatty material may be used in such acidic state as the treating agent of our process, but since such fatty material, in most instances, contains traces of sulfuric acid or organic acids which affect its stability and also render it corrosive to metal, it is desirable to neutralize the said fatty material, wholly or in part, by means of a suitable base. We prefer to use ammonia as the neutralizing agent, and carry the neutralization to such a point that all of the strong acid hydrogen and a portion of the carboxyl hydrogen are neutralized, but various other neutralizing agents may be employed, such as caustic soda, and the particular degree to which the mass is neutralized may be varied, inasmuch as specific cases may require different bases and different degrees of neutralization.

In stating above that the hydrogenated oil is subjected to "sulfonation", we do not mean that the product of the reaction is a compound containing the sulfonic or $SO_3H$ group, but, on the contrary, we mean simply a chemical reaction in which sulfuric acid is employed. In some cases fatty acid sulfates are obtained or produced in the operation of manufacturing or preparing the treating agent contemplated by our process, and in other cases true sulfonic acids are produced or obtained. In still other instances prctically all of such sulfur-containing products are removed by hydrolysis. However, the product of the reaction would still be considered a sulfonated product, in spite of the fact that it contains almost no organically combined sulfur.

If desired, suitable solvents, such as kerosene, alcohol, tar acid oil, etc. may be incorporated in the treating agent either before or after the sulfonation of the multi-active fatty material, and by varying the procedure of manufacture, as to specific amounts of ingredients and conditions of preparation and reaction, the treating agent may be made oil-soluble, water-soluble, or oil and water soluble.

One specific example of a treating agent suitable for use in our process is a material of the following composition, produced by the following procedure:

*Example 1.*—Hydrogenated castor oil, 225 parts by weight, is mixed with kerosene, 25 parts by weight, and then reacted with 66° sulfuric acid, 100 parts by weight, the mixture being stirred for approximately one hour at a temperature of approximately 35° C. after the acid has been added. The mass is then washed with water. It is then settled or permitted to stand in a quiescent state and the acid water is then drawn off. Subsequently, the acidic oil layer is neutralized with ammonia, specific gravity 0.90, to make a good 10% solution in water.

*Example 2.*—Hydrogenated linseed oil, 100 parts by weight, is mixed with alcohol, 20 parts by weight, and the mixture is then stirred with 25 parts by weight of 66° sulfuric acid at 30° C. until the mass becomes water-soluble. The mixture is then washed with a sodium sulfate solution and is thereafter neutralized slightly past the methyl orange end point with 20% caustic soda.

In treating petroleum emulsions with our improved treating agent, the treating agent may be introduced into the emulsion directly, or it may be introduced in solution, in water or in oil. Any of the methods now employed to introduce chemicals for the treatment of such emulsions may be used. For example, the treating agent may be introduced into a well in which the emulsion is being produced; it may be introduced into a conduit through which the emulsion is flowing; it may be introduced into a tank in which the emulsion is stored; or it may be introduced into a container which holds a sludge obtained from the bottom of an oil storage tank. In some cases, it may be desirable to introduce the treating agent into a producing well in such a way that it will become mixed with the water and oil that are emerging from the surrounding stratum before said water and oil enter the barrel of the well pump or the tubing, up through which said water and oil flow to the surface of the ground.

After treatment, the mixture of emulsion and treating agent is allowed to stand in a quiescent state, usually in a settling tank, and at a suitable temperature, varying from atmospheric temperature to about 200° F. By this means, the water or brine separates from the oil. It is preferable to maintain as low a temperature as practicable, in order that volatile constituents of the oil are not vaporized and lost. If desirable, the treated emulsion may be acted upon by one or more of the various kinds of apparatus now used in connection with the breaking of petroleum emulsions, such as homogenizers, hay tanks, gun barrels, filters, centrifuges, or electrical dehydrators.

The amount of treating agent required to resolve any particular emulsion will vary, being dependent on the temperature employed, the type of treating equipment used, and other conditions. The type of oil, the fineness of the emulsion, the nature of the water dispersed, the type of treatment and of treating equipment are all factors that influence the amount of treating agent required. In general, it can only be said that the use of a minimum of treating agent is desirable, for economic reasons; and that such minimum may be 1/500 the amount of dehydrated oil recovered, or it may be as little as 1/20,000 or 1/30,000 this amount. We have found that a ratio of 1 part of treating reagent to 5000 parts of emulsion will usually be found to produce commercially satisfactory results.

Having thus described our invention, what we claim as new and desire to secure by Letters Patent is:

1. A process for the resolution of petroleum emulsions of the water-in-oil type, which consists in subjecting the emulsion to the action of a demulsifying agent comprising a simple genetic derivative of a hydrogenated multi-active fatty material.

2. A process for the resolution of petroleum emulsion of the water-in-oil type, which consists in subjecting the emulsion to the action of a demulsifying agent comprising a simple genetic water-soluble derivative of a hydrogenated multi-active fatty material.

3. A process for the resolution of petroleum emulsions of the water-in-oil type, which consists in subjecting the emulsion to the action of a demulsifying agent comprising an ammonium salt of a simple genetic derivative of a hydrogenated multi-active fatty material.

4. A process for the resolution of petroleum emulsions of the water-in-oil type, which consists in subjecting the emulsion to the action of a demulsifying agent comprising a simple genetic sulfonated derivative of a hydrogenated multi-active fatty material.

5. A process for the resolution of petroleum emulsions of the water-in-oil type, which consists in subjecting the emulsion to the action of a demulsifying agent comprising a simple genetic water-soluble sulfonated derivative of a hydrogenated multi-active fatty material.

6. A process for the resolution of petroleum emulsions of the water-in-oil type, which consists in subjecting the emulsion to the action of a demulsifying agent comprising an ammonium salt of a simple genetic sulfonated derivative of a hydrogenated multi-active fatty material.

7. A process for the resolution of petroleum emulsions of the water-in-oil type, which consists in subjecting the emulsion to the action of a demulsifying agent, comprising a simple genetic derivative of a hydrogenated hydroxylated fatty material.

8. A process for the resolution of petroleum emulsions of the water-in-oil type, which consists in subjecting the emulsion to the action of a demulsifying agent comprising a simple genetic water-soluble derivative of a hydrogenated hydroxylated fatty material.

9. A process for the resolution of petroleum emulsions of the water-in-oil type, which consists in subjecting the emulsion to the action of a demulsifying agent comprising an ammonium salt of a derivative of a hydrogenated hydroxylated fatty material.

10. A process for the resolution of petroleum emulsions of the water-in-oil type, which consists in subjecting the emulsion to the action of a demulsifying agent, comprising a sulfonated derivative of a hydrogenated hydroxylated fatty material.

11. A process for the resolution of petroleum emulsions of the water-in-oil type, which consists in subjecting the emulsion to the action of a demulsifying agent, comprising a water-soluble sulfonated derivative of a hydrogenated hydroxylated fatty material.

12. A process for the resolution of petroleum emulsions of the water-in-oil type, which consists in subjecting the emulsion to the action of a demulsifying agent, comprising an ammonium salt of a sulfonated hydrogenated hydroxylated fatty material.

13. A process for the resolution of petroleum emulsions of the water-in-oil type, which consists in subjecting the emulsion to the action of a demulsifying agent, comprising a sulfonated derivative of hydrogenated castor oil.

14. A process for the resolution of petroleum emulsions of the water-in-oil type, which consists in subjecting the emulsion to the action of a demulsifying agent, comprising a water-soluble sulfonated derivative of hydrogenated castor oil.

15. A process for the resolution of petroleum emulsions of the water-in-oil type, which consists in subjecting the emulsion to the action of a demulsifying agent comprising an ammonium salt of a sulfonated derivative of hydrogenated castor oil.

16. A process for the resolution of petroleum emulsions of the water-in-oil type, which consists in subjecting the emulsion to the action of an oil-soluble demulsifying agent, comprising a derivative of a hydrogenated multi-active fatty material.

17. A process for the resolution of petroleum emulsions of the water-in-oil type, which consists in subjecting the emulsion to the action of a demulsifying agent comprising an oil-soluble sulfonated derivative of a hydrogenated multi-active fatty material.

18. A process for the resolution of petroleum emulsions of the water-in-oil type, which consists in subjecting the emulsion to the action of a demulsifying agent comprising an oil-soluble derivative of a hydrogenated hydroxylated fatty material.

19. A process for the resolution of petroleum emulsions of the water-in-oil type, which consists in subjecting the emulsion to the action of a demulsifying agent, comprising an oil-soluble sulfonated derivative of a hydrogenated hydroxylated fatty material.

20. A process for the resolution of petroleum emulsions of the water-in-oil type, which consists in subjecting the emulsion to the action of a demulsifying agent, comprising an oil-soluble sulfonated derivative of hydrogenated castor oil.

MELVIN DE GROOTE.
LOUIS T. MONSON.